(12) United States Patent
Pinard et al.

(10) Patent No.: US 9,756,485 B2
(45) Date of Patent: Sep. 5, 2017

(54) METHODS AND SYSTEMS FOR WALKIE-TALKIE COMMUNICATIONS

(71) Applicants: Deborah Lynn Pinard, Dunrobin (CA); Melissa Pinard, Kanata (CA); Liam Williams, Ottawa (CA)

(72) Inventors: Deborah Lynn Pinard, Dunrobin (CA); Melissa Pinard, Kanata (CA); Liam Williams, Ottawa (CA)

( * ) Notice: Subject to any disclaimer, the term of this patent is extended or adjusted under 35 U.S.C. 154(b) by 0 days.

(21) Appl. No.: 14/873,369

(22) Filed: Oct. 2, 2015

(65) Prior Publication Data
US 2016/0100295 A1    Apr. 7, 2016

Related U.S. Application Data

(60) Provisional application No. 62/058,741, filed on Oct. 2, 2014.

(51) Int. Cl.
| | |
|---|---|
| *H04B 7/00* | (2006.01) |
| *H04W 4/10* | (2009.01) |
| *G06Q 10/06* | (2012.01) |
| *H04W 4/06* | (2009.01) |
| *H04W 4/08* | (2009.01) |

(52) U.S. Cl.
CPC ............ *H04W 4/10* (2013.01); *G06Q 10/06* (2013.01); *H04W 4/06* (2013.01); *H04W 4/08* (2013.01)

(58) Field of Classification Search
CPC .......... H04W 4/06; H04W 4/08; H04W 4/10; H04W 76/005; G04Q 10/06

USPC ......... 455/90.2, 412.1, 414.1, 518–520, 416; 370/352, 389, 338, 328
See application file for complete search history.

(56) References Cited

U.S. PATENT DOCUMENTS

| | | | | |
|---|---|---|---|---|
| 7,693,528 | B2* | 4/2010 | Teppo | H04L 12/5855 455/414.3 |
| 7,809,388 | B1* | 10/2010 | Othmer | H04M 1/6505 455/426.1 |
| 8,972,262 | B1* | 3/2015 | Buryak | G10L 15/28 704/251 |
| 2005/0197748 | A1* | 9/2005 | Holst | G06F 8/61 701/3 |
| 2008/0268826 | A1* | 10/2008 | Nelson | H04W 4/08 455/416 |
| 2008/0276304 | A1* | 11/2008 | Maffione | H04L 63/02 726/4 |

(Continued)

*Primary Examiner* — Dominic Rego
(74) *Attorney, Agent, or Firm* — Rosenberg, Klein & Lee

(57) ABSTRACT

Walkie-talkies are a common means of coordinating activities at events but must be handed out, transferred as shifts and personnel in roles change, and collected. Further, walkie-talkies have a set range and the bigger the range the more expensive the walkie-talkie. Accordingly, it would be beneficial to provide individuals, enterprises, organizers, etc. with the ability to establish communications to individuals or group of individuals rapidly, with low complexity and management overhead, exploiting walkie-talkie style communications upon mobile devices connected to wireless networks over varying geographical areas without requiring distribution of walkie-talkies etc. as the mobile device is the user's own smartphone or cellphone. Further, it would be beneficial for such communications to be managed through a software application such that the user's virtual walkie-talkie automatically assigns channels etc. based upon the user's role, the event, their location etc.

14 Claims, 13 Drawing Sheets

(56) References Cited

U.S. PATENT DOCUMENTS

| | | | | |
|---|---|---|---|---|
| 2009/0298474 | A1* | 12/2009 | George | G10L 13/00 |
| | | | | 455/412.2 |
| 2010/0299702 | A1* | 11/2010 | Lo | G06Q 20/123 |
| | | | | 725/39 |
| 2013/0144725 | A1* | 6/2013 | Li | H04N 21/23424 |
| | | | | 705/14.66 |
| 2013/0340029 | A1* | 12/2013 | De Armas | H04L 63/20 |
| | | | | 726/1 |
| 2014/0223572 | A1* | 8/2014 | Roh | G06F 17/2235 |
| | | | | 726/26 |
| 2015/0100463 | A1* | 4/2015 | Drazin | G06Q 10/101 |
| | | | | 705/27.1 |
| 2015/0245168 | A1* | 8/2015 | Martin | H04W 4/02 |
| | | | | 715/751 |
| 2015/0312220 | A1* | 10/2015 | Crawford | H04L 63/0236 |
| | | | | 726/12 |
| 2016/0044716 | A1* | 2/2016 | Hassan | H04W 52/04 |
| | | | | 455/522 |
| 2016/0065742 | A1* | 3/2016 | Nasir | H04M 3/56 |
| | | | | 455/416 |
| 2016/0182666 | A1* | 6/2016 | Rathod | G06F 17/30867 |
| | | | | 709/218 |

\* cited by examiner

METHODS AND SYSTEMS FOR WALKIE-TALKIE COMMUNICATIONS

CROSS-REFERENCE TO RELATED APPLICATIONS

This patent application claims the benefit of U.S. Provisional Patent Application 62/058,741 filed Oct. 2, 2014 entitled "Role-Based Smartphone Walkie-Talkie", the entire contents of which are included herein by reference.

FIELD OF THE INVENTION

This invention relates to the field of voice and data communications, and in particular to creating and managing walkie-talkie functionality on portable devices and communications based upon a person's role within an event.

BACKGROUND OF THE INVENTION

There are a wide range of instances where a group of individuals are coordinated for an event. Examples of such events can include, but are not limited to, birthday parties, weddings, christenings, funerals, school trips, concerts, business meetings, conferences, charity events, and reunions. Today, in order to set up such events a range of options exist with respect to communication tools including, for example, Simple Messaging Service (SMS), telephone, social media such as Facebook™, messaging services such as Twitter™, email, and web based services such as Google Events.

In the majority of instances these events are based at a particular location (e.g. an office, church, restaurant, concert hall, etc.) although in other instances these may be a range of locations (e.g. a charity run requiring volunteers at the start, finish and runner registration) and whilst typically over a generally small geographic area the multiple locations may be over an extended geographic area (e.g. Rio de Janeiro for the Summer Olympics). Accordingly, the number of helpers, volunteers, attendees, support staff, event staff may range from a few to hundreds to thousands. Within the prior art organizers of such events would exploit walkie-talkies which would be provided to specific volunteers to handle communications between them. Different channels upon a walkie-talkie can be selected so that multiple conversations can occur concurrently. However, these walkie-talkies must be handed out to those individuals/staff/volunteers deemed to need them, be passed on as shifts and personnel in roles change, and collected at the end of the day. Further, walkie-talkies have a set range and the bigger the range the more expensive the walkie-talkie.

Over the past few years with the increasing penetration and functionality of cellular telephones and so-called smartphones there have been several "push-to-talk" applications including, but not limited to, Voxer, iPTT, HeyTell, and Zello which provide users with basic walkie-talkie functionality such as one-to-one and one-to-group messaging. However, the other users must be contacts of the user and when a group is formed the members of a group must be known.

Accordingly, it would be beneficial to provide individuals, enterprises, organizers, etc. with the ability to establish communications to individuals or group of individuals rapidly, with low complexity and management overhead, exploiting walkie-talkie style communications upon mobile devices connected to wireless networks over varying geographical areas without requiring distribution of walkie-talkies etc. as the mobile device is the user's own smartphone or cellphone. Further, it would be beneficial for such communications to be managed through a software application such that the user's virtual walkie-talkie automatically assigns channels etc. based upon the user's role, the event, their location etc.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to the field of data communications and more particularly to a system for finding the location and/or status of other individuals.

In accordance with an embodiment of the invention there is provided a method of mobile communications comprising:
receiving content within a software application in execution upon an electronic device;
associating the received content with a communication based upon a filter defined by a policy chain established within the software application; and
presenting the information upon the electronic device.

In accordance with an embodiment of the invention there are provided computer readable instructions for execution by a microprocessor stored in a non-volatile, non-transitory memory, the instructions when executed relating to a process comprising:
receiving content within a software application in execution upon an electronic device;
associating the received content with a communication based upon a filter defined by a policy chain established within the software application; and
presenting the information upon the electronic device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
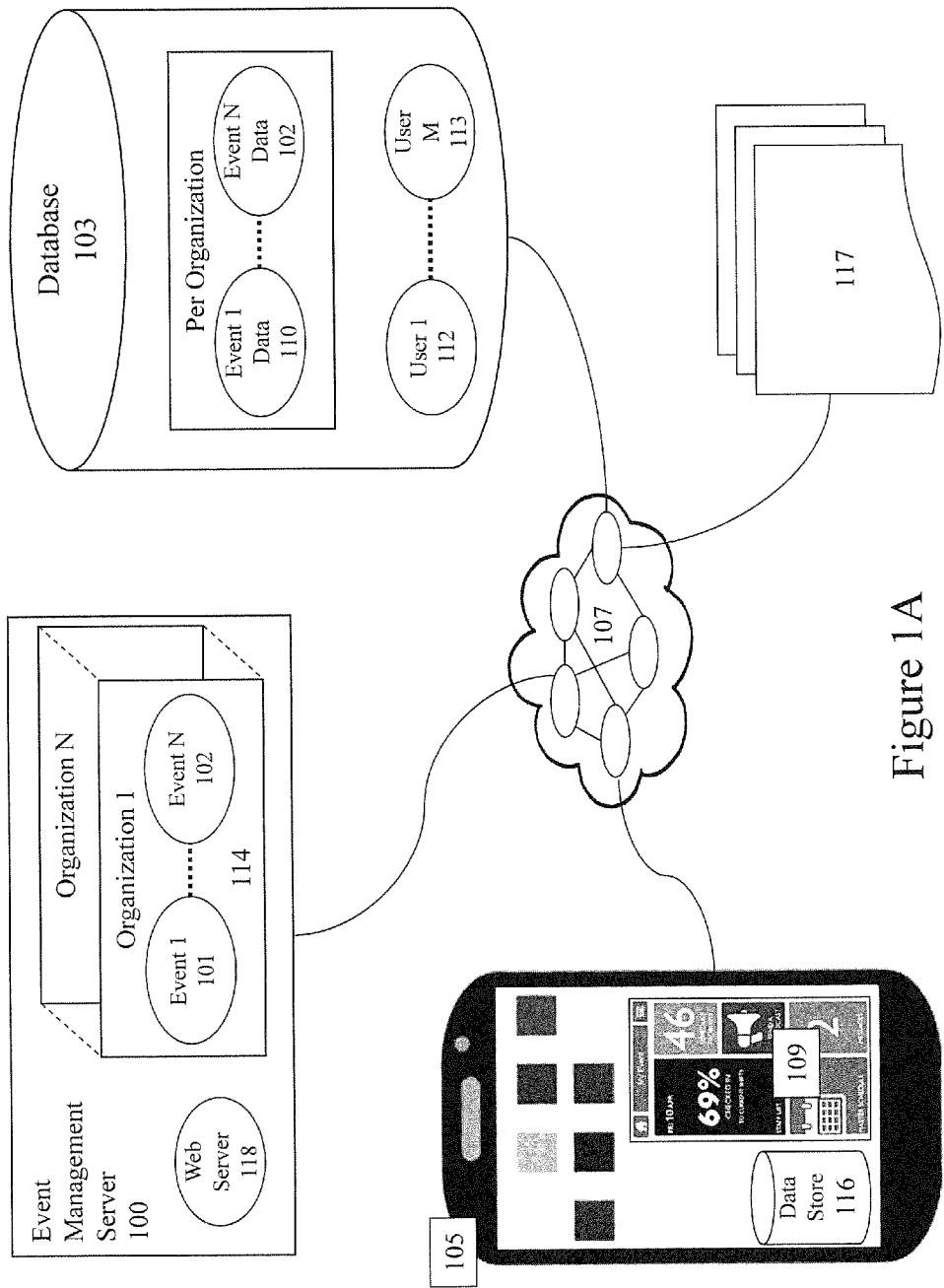
FIG. 1A depicts a network diagram of the system according to an embodiment of the invention.

The present invention is directed to the field of field of data communications and more particularly to a system for finding the location and/or status of other individuals.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements and that the invention the invention is intended to cover all alternatives, modifications, and equivalent arrangements without departing from the scope which is as set forth and defined within the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals which includes, but is not limited to, private individuals, employees of organizations and/or enterprises, members of community organizations, members of charity organizations, men, women, children, and teenagers. In its broadest sense the user may further include, but not be limited to, software systems, mechanical systems, vehicle systems, physical assets, robotic systems, android systems, etc. that may be characterised by mobility and location such their location may be an aspect of them which is desired to be known at a particular instant.

An "event" as used herein may refer to, but is not limited to, a planned public or social occasion, happening, proceeding, incident, affair, function, gathering, "bash", competition, contest, tournament, round, fixture, race, conference, meeting, and appointment.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "walkie-talkie" (more formally known as a handheld transceiver, or "push-to-talk" radio) within the prior art is a hand-held, portable, two-way radio transceiver exploiting a half-duplex channel such that only one radio transmits at a time though any number can listen and a "push-to-talk" switch that starts transmission. Similarly prior art walkie-talkies employ a built-in speaker which can be heard by the user and those in the user's immediate vicinity. "Walkie-talkie" applications/platforms (WKTKAPs) as embodied within embodiments of the invention provides functionality which is comparable to that of a walkie-talkie in respect of pushing primarily voice communications from a user's portable device to other portable devices but does so by exploiting a software application in execution upon a user's PED/FED.

The system(s) and/or application(s) described below in respect of embodiments of the invention may be employed in a standalone manner or they may, alternatively, be a feature of or be used as part of a larger system for creating, managing, running and/or coordinating an event. Within the embodiments of the invention described below these are described with respect to "walkie-talkie" applications/platforms (WKTKAPs) that support communications between users associated with an event or activity by their roles and assignments to said roles without any prior knowledge of the others users by the user as this is coordinated through supervisory/management roles employing the WKTAPs according to embodiments of the invention.

Within the following description and reference to FIGS. 1 to 7 the invention is presented with respect to an inventive system allowing event planners to set up a staff schedule starting with the event, the venue associated with the event, define a location within the venue, define shifts within the venue or location, define roles within each shift, and the define the people assigned to each shift/role. The functionality of the "walkie-talkie" applications/platforms (WKTKAPs) accessed by the user(s) are defined in terms of this hierarchy. Accordingly, users (e.g. volunteers) need only download the software application to their smartphone, for example, and then subsequently the software application's functionality and, in some instances, even access to the software application and/or its features is defined by association of the user to a role, to a shift, to a location, to a venue, and to an event. For example, a volunteer to the Rio de Janerio 2016 Olympics may be associated therefore to this as the event, the location for them is the Rodrigo de Freitas Lagoon, site of rowing and canoeing competitions, their shift may be 8 am-1 pm Sunday Aug. 9, 2016, and their role is security. In some instances their role may define the location to even greater precision and/or define a geofenced location associated with their shift. For example, this user assigned to security may be given a geofenced region of the Parque Natural Municipal Jose Guilherme Merquior on the eastern shore of the lagoon. In contrast a ticket role may defined as being Gate 1 at Parque dos Patins-Lagoa on Av. Borges de Medeiros.

Within the following description and reference to FIGS. 1 to 7 the invention is presented with respect to an inventive system wherein the embodiments of the invention exploit a structure described and depicted within the World Patent Application PCT/CA2013/000717 entitled "A Communication System Facilitating a Contextual Environment for a User Filing Various Role Agents" published Apr. 10, 2014 and filed Aug. 15, 2013 and claiming priority to US Patent Publication 2014/0,101,556 of the same name filed Oct. 4, 2012. However, it would be evident that other hierarchies and associations of users to activities, tasks, etc. may be employed without departing from the scope of the invention. The embodiments of the invention are described with respect to a system for replacing the walkie-talkies normally employed in communications between volunteers, etc. with a portable device application, and associating the channels on the virtual walkie-talkie (VIWKTK) with the roles in the event. The roles for the event are created by the event planner(s).

Within this specification in respect of embodiments of the invention there are described methods and systems for routing communications based on a connection (policy chain) to get to the right organization, then mission, then role within a mission, etc. The embodiments exploit the same structure to determine a specific group of people at a specific time, and with mobile device functionality that mimics a walkie-talkie, allow them to communicate based on the role that they are currently in, or the venue or location that they are currently at.

The users associated with a role or venue can change based on the shift characteristics, e.g. time, or, if the user does not show up, they can be replaced by another person in real time wherein the new user is automatically provided with the appropriate access to channels etc. based upon the policy chain. Further, staff can sign in and out of shifts for breaks. Embodiments of the invention provide for a method of grouping people specific to a role/venue/location at a specific instance in time which addresses the requirements of such systems as prior art static programming of pre-determined groups of people does not work within dynamic environments wherein personnel changes may arise through a plurality of unforeseen circumstances or new groups need to be established and activated in real time to respond to unplanned events or trigger responses to emergencies etc.

Referring to FIG. 1A there is depicted an event management server 100 connected to a network 107, such as a local area network, wide area network, or global network such as the Internet, commonly referred to as the "cloud." For each organization 114, e.g. Organizations 1 to N, there may be multiple events, e.g. Event 1 to Event N, each executing a separate instance of the WKTKAP, namely Event 1 101 and Event N 102. Also depicted is a database 103, also connected to the network 107 which stores all the data specific to each organization's events, e.g. Event 1 Data 110 and Event N Data 111. The database 103 also contains user data, e.g. User 1 112 and User M 113, which is data specific to each user using the system. This data includes, typically, for each user a mobile phone number associated with the user's smartphone or wirelessly connected PED to a telecommunications infrastructure. A plurality of web pages 117 are used to program all the elements of the system and store them in the database 103. The web pages 117 can also be used to display real time information to any specific user of the system with the appropriate privileges, as known in the art. Each user of the system has a specific role at a specific time and has a device 105 (e.g. smartphone, tablet computer or PED with web access). Each device 105 has an event application (EVAP) 109 running as an embodiment of a WKTKAP according to an embodiment of the invention. Data can be sent from the event management server 100 to the device 105 via the network 107 and to the EVAP 109. The EVAP 109 may also store its own data with a PED data store 116.

Figure 1B:
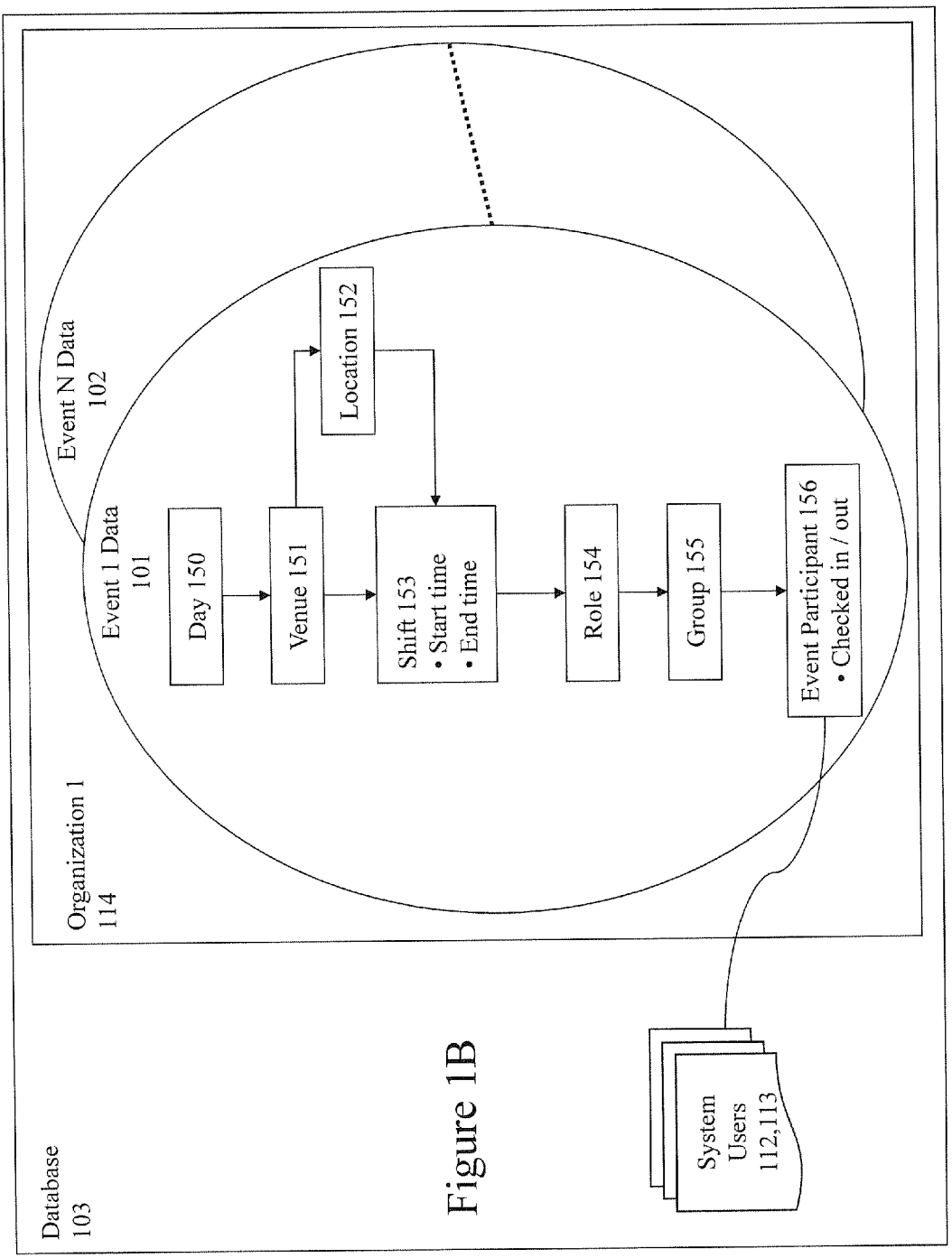
FIG. 1B depicts schematically a hierarchy of the tables within a database according to an embodiment of the invention.

Referring to FIG. 1B there is depicted an example of hierarchy of the event data, e.g. Event 1 101 and Event N 102, for an organization according to an embodiment of the invention, e.g. Organization 1 114, in the database 103. As depicted the hierarchy comprises:

Days 150, which may contain venues 15 associated with a day or days;

Venues 151, which can contain locations 152 associated with the location(s);

Shifts 153, which can exist for either venues 151 or locations 152 and may contain, for example, start times and end times.

Roles 154, which are generally contained within shifts 153 and are filled by a group 155;

Groups 155 which define the users associated to them and may range from a single participant 156 to all participants associated to the event.

Each participant 156 may also have one or more statuses associated, such as reported, in shift, out of shift (break), checked in, checked out, etc. The event participant 156 also points to a user 112, 113 in the database 103.

Figure 2:
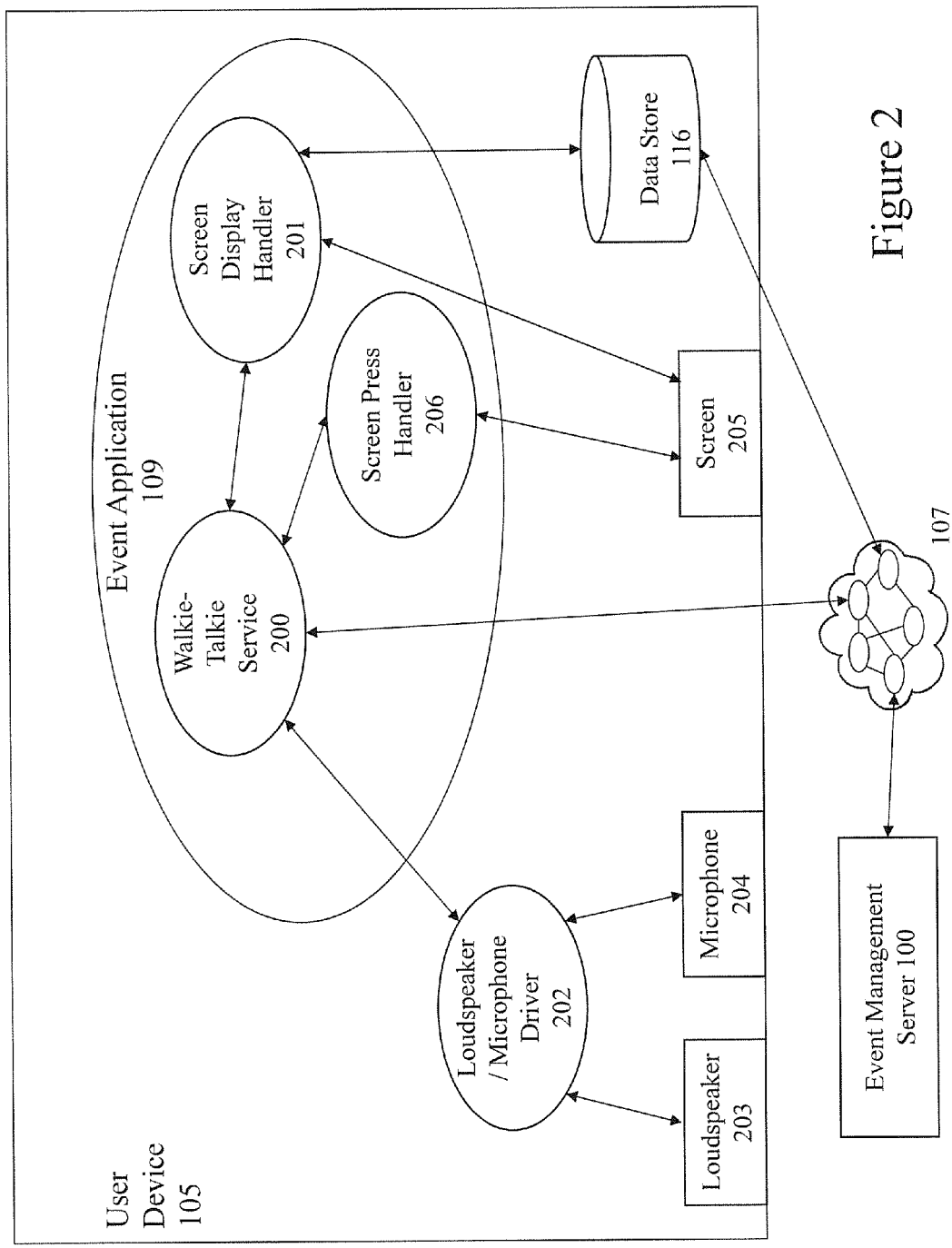
FIG. 2 depicts schematically a walkie-talkie service within an event application on the user's portable device according to an embodiment of the invention.

Now referring to FIG. 2 there is depicted a more detailed diagram of the EVAP 109 installed upon the user's device 105. Inside the EVAP 109 is a walkie-talkie (WKTK) service 200 which uses the speaker/microphone (SPEMIC) driver(s) 202 of the user device 105 to interface with the speaker 203 and microphone 204. The screen display handler 201 uses the local data store 116 to retrieve the role and push data to display on the screen 205. The screen press handler 206 interfaces with the screen 205 and is used to inform the WKTK service 200 of button presses on the screen 205 for the EVAP 109. The WKTK service 200 interfaces with the event management server 100 through the network 107 to send and receive sound bites (messages from other users) and the appropriate filters.

Figure 3A:
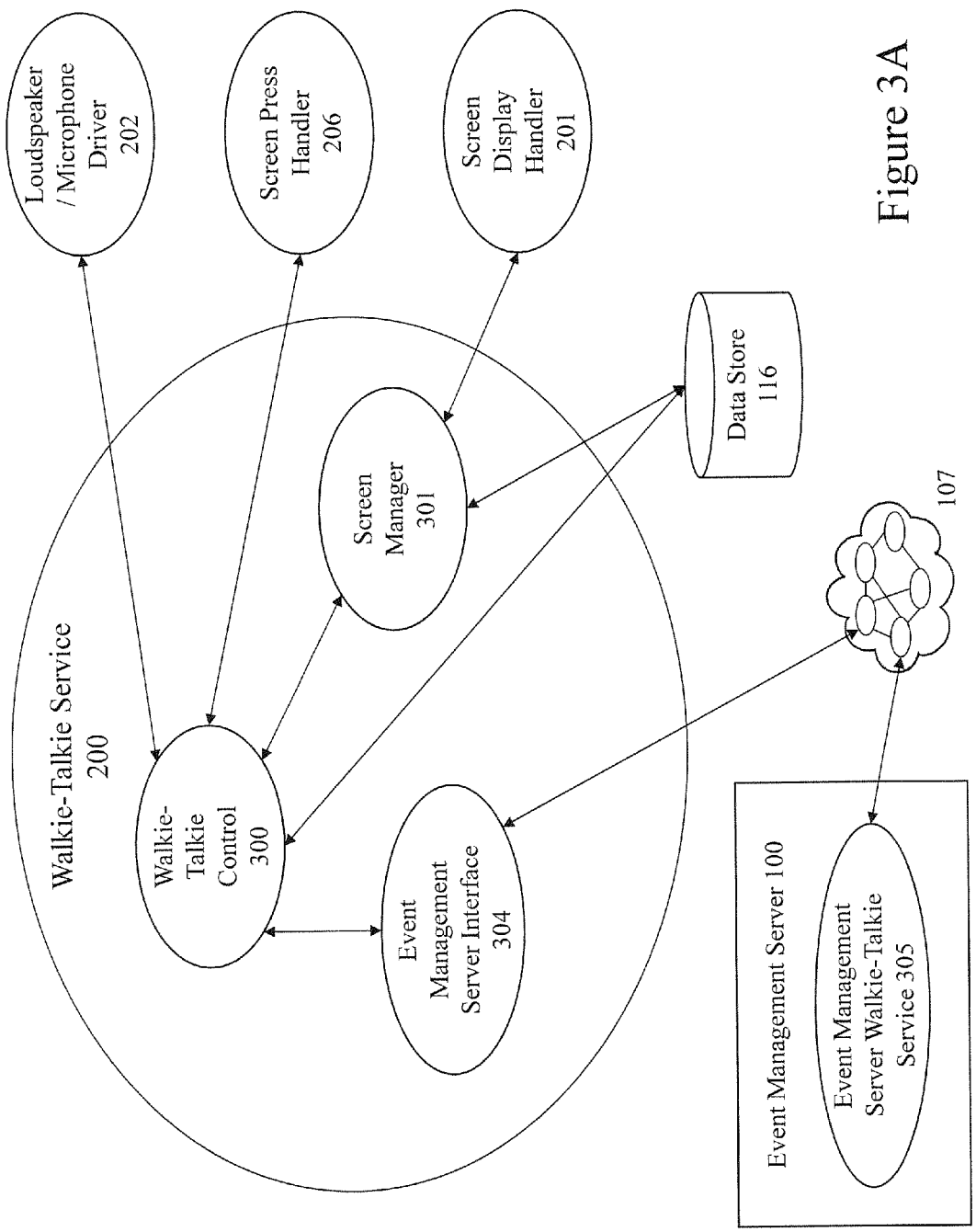
FIG. 3A depicts a more detailed schematic of the walkie-talkie service within an event application on a user's portable device according to an embodiment of the invention.

Referring to FIG. 3A the WKTK service 200 is depicted in more detail wherein the WKTK control 300 is responsible for the control of the WKTK functionality on the user's user device 105. When the user selects to use the WKTK via a button press through the screen press handler 206, the WKTK control 300 gets the screen manager 301 to get the filter data from the data store 116 and pass it to the screen display handler 201 (see FIG. 5) to display on the screen. Once the user has selected the filter they want, then they are asked to press a button and talk into the microphone, just as with a conventional prior art walkie-talkie. The screen press handler 206 informs the WKTK control 300 when the talk button is pressed and the WKTK control 300 uses the SPEMIC driver 202 to turn on the microphone and record. The screen press handler 206 informs the WKTK control 300 when the talk button is released or pressed again depending on functionality of the WKTKAP. In this event the WKTK control 300 uses the SPEMIC driver 202 to turn off the microphone and store the sound bite. The sound bite is then stored in the data store 116.

At this point the WKTK control 300 then creates a session ID (or uses an existing one if it is part of an existing conversation) and sends it and the filter data and the sound bite to the event management service (EMS) WKTK service 305 on the event management server 100 via the network 107. The EMS WKTK service 305 determines the group of people to send the sound bite to (see FIG. 3B) and sends it to the various WKTK controls 300 along with the session ID and the sender of the message. The WKTK control 300 receives the sound bite and session ID and stores it in the data store 116. It then uses the screen manager 301 to inform the user of a new message and uses the SPEMIC driver 202 to play the sound bite on the speaker. If the user wants to respond to the message, then the session ID is kept and sent back so that the people in the original conversation are kept together.

Figure 3B:
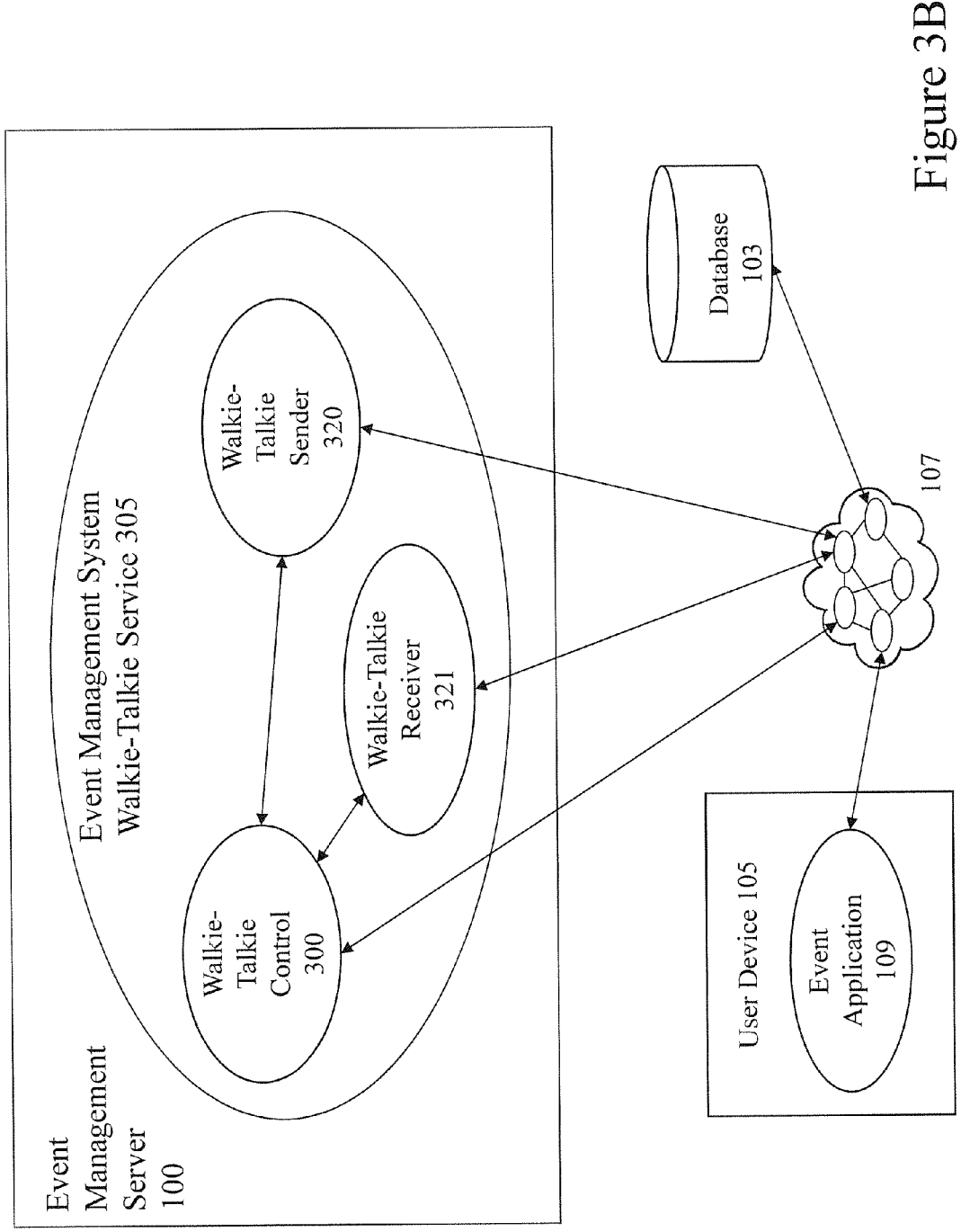
FIG. 3B depicts schematically the walkie-talkie service within the event manager server according to an embodiment of the invention.
Figure 4:
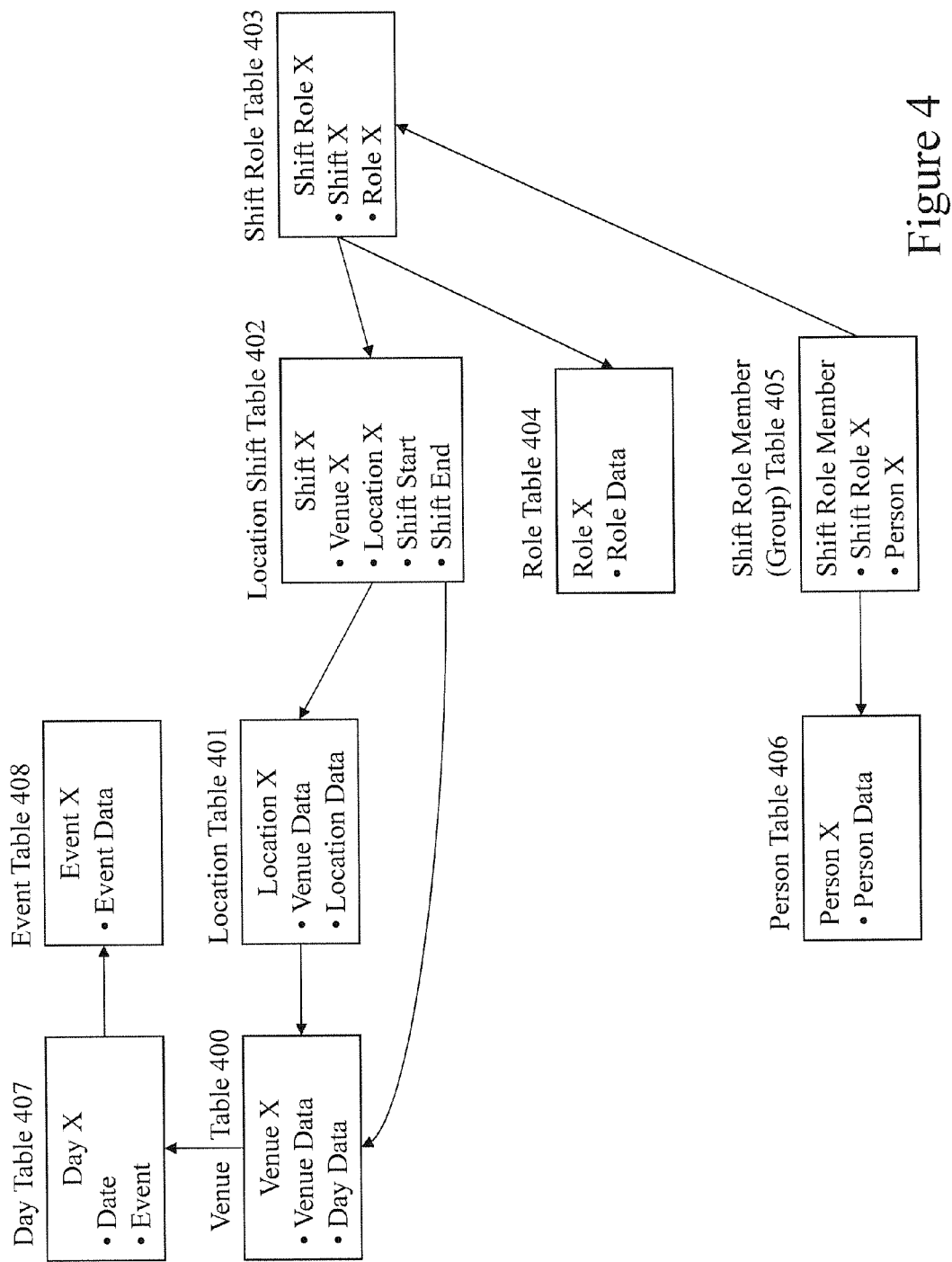
FIG. 4 depicts the relationships between database tables according to an embodiment of the invention.

FIG. 3B depicts in more detail the functionality of the EMS WKTK service 305 within the event management server 100. The WKTK receiver 321 receives the session ID, the filter data and sound bite from the user device 105 EVAP 109 via the network 107. It then informs the WKTK control 322 that is has received new data. Based on the data in the filter the EMS WKTK control 322 uses the database 103 to retrieve the correct group of people to send the sound bite to. These people, including the sender, are then stored against the session ID. (FIG. 4 shows the relationships in the database to do this). For each user, it then uses the WT sender 320 to send the sound bite to each of the appropriate EVAPs 109 (excluding the sender). Any subsequent sound bites for this conversation are stored with the session ID until the session is terminated by the original sender. The sender can also choose to make to a broadcast (one-way only) message. Some users can be set to only have the ability to receive a WKTK message, but not send one.

Now referring to FIG. 4 there are depicted a set of exemplary database table relationships that allow for the correct determination of the group of users to send a sound bite to according to an embodiment of the invention. As depicted the event table 408 is the table used to connect all the data for a specific event. Each day of the event is stored in the day table 407 (along with the date) which points back to the event table 408. Each venue that is used on a specific day of the event is contained in the venue table 400, which points back to the day table 407 and contains the venue data. Each location being used within the venue for the event is stored in the location table 402, which points back to the venue table 400 and stores the location data. Each shift within a location for that day of the event is stored in the location shift table 402, which contains the start time and end time for the shift and points back to the location table 401 or venue table 400. Every role that is in a specific shift in a location for the day of the event is stored in the shift role table 403. It points back to the specific shift in the shift table 402 and points to the specific role in the role table 404 which contains all of the role data. The shift role member table has an instance for each member in the shift role, and contains the shift role that points back to the shift role table 403. It also points to the specific person table 406 which contains the person data. The person data tells the system which app(s) is associated with the person.

If the filter is for everyone in a specific location scheduled now, then for the current day and time (which determines which shifts to look at) the group of people (and corresponding applications) is collected. If the filter is for a specific role or set of roles, then for the current day and time scheduled now (which determines which shifts to look at) each role on the list is matched against each current shift via the shift role table to determine the group of people (and corresponding applications) to collect. If the filter is for scheduled anytime, then it just uses the day and all shifts. If it is set for not scheduled now, then it takes the two groups and eliminates the scheduled now ones. The person data in the person table also has the status (checked-in/out) of the person to further filter the data if necessary.

Figure 5A:
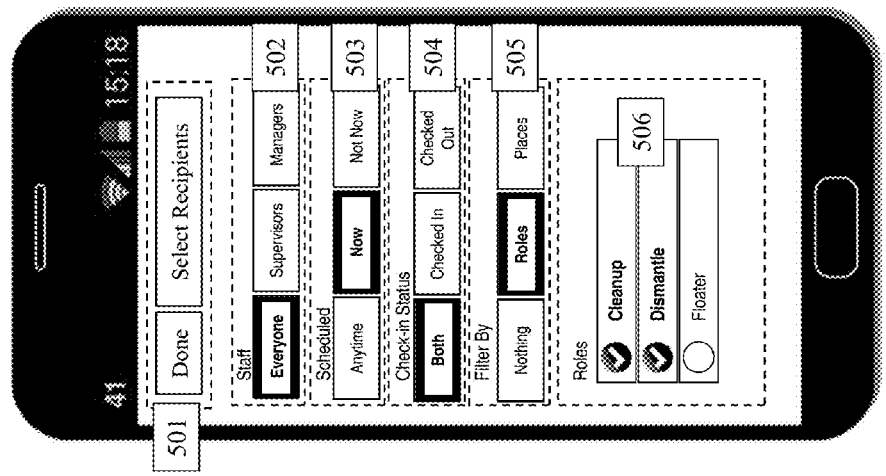
FIG. 5A depicts an exemplary user device screen for setting up filters according to an embodiment of the invention.

Referring to FIG. 5A there is depicted an exemplary screenshot presented to a user for a user to use for filtering who they are talking to on the WKTKAP. Supervisors and managers are system roles, and when selected, the "filter by" can be either disabled or used to further determine what supervisors or managers are used. As depicted the user is presented with several field blocks 501 to 506 which represent:

First block 501, wherein the user may either select recipients or indicate completion;
Second block 502, wherein the user selects to communicate with everyone, supervisors or managers;
Third block 503, wherein the user can select a scheduling option such as anytime, now or not now;
Fourth block 504; wherein the user can select the status of other users, e.g. checked in, checked out or both;
Fifth block 505 wherein the user can select other users or not (the nothing option) but if filtering then, as depicted, by role or place (location); and
Sixth block 506, which adjusts according to selection in fifth block 505 such that in the instance depicted of role the user is presented with a list of roles associated with the event, e.g. cleanup, dismantle, floater, etc.

Within other embodiments of the invention some and/or blocks and options within the blocks may be disabled (not shown or non-functional) in dependence upon the user's role/status etc. Optionally, the blocks/options may be adjusted dynamically in response to a variation within the policy chain associated with the user, a group of users, or all users. For example, within an event security personnel may not be able to select everyone and only communicate with checked-in and "now" scheduled users but all roles. However, in the event of an emergency the policy chain may be amended which when pushed to the user's mobile device will change these options.

Figure 5B:
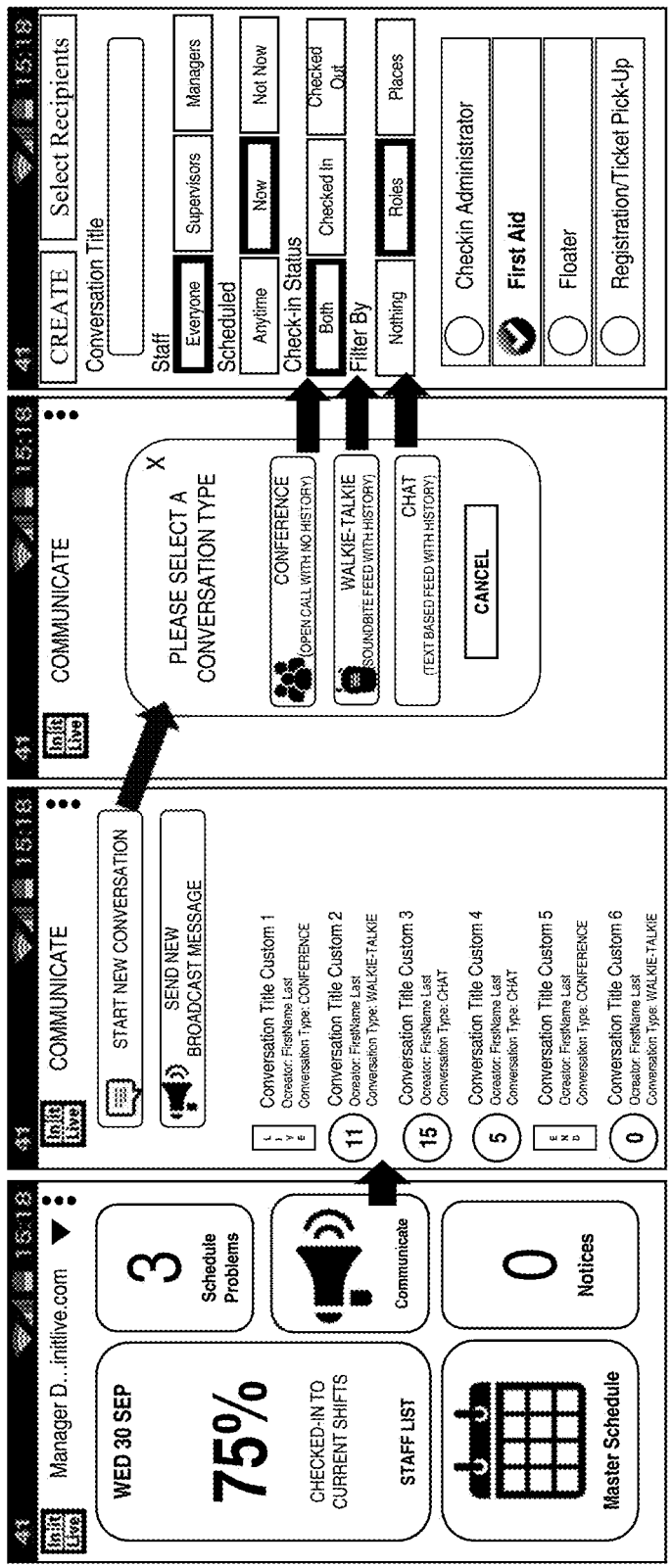
FIGS. 5B to 5E depict exemplary screenshots from a walkie-talkie application according to an embodiment of the invention for different actions performed by a user of the application.

Now referring to FIG. 5B there are depicted first to fourth exemplary screenshots 511 to 514 respectively for a WKTKAP according to an embodiment wherein the user initiates a communication session. Accordingly, in first screenshot 511, a default screen for the WKTKAP in some embodiments, the user is a "Manager" as depicted in header with fields relating to staffing, schedule, notifications, schedule problems, and communicating. Selection of "Communicate" triggers second screenshot 512 wherein the user is presented with options to start a new conversation, send a broadcast message, or send a message with respect to an existing conversation. If the user selects to start a new conversation then they are presented with third screenshot 513 which relates to options for the conversation which are depicted as:

Conference, which opens a call channel with no history;
Walkie-Talkie, which establishes a sound bite feed with history; and
Chat, which is text based feed with history.

Once the user makes a selection they are presented with fourth screenshot 514 wherein they may select the user(s) to whom the conversation is established based upon application of the one or more filters such as described and depicted in respect of FIG. 5A. However, as the conversation has not started then the user is able to enter a conversation title, e.g. "Missing Grandmother in Mosh Pit" or "Running Short of Bandages at Forward Field Hospital."

Figure 5C:
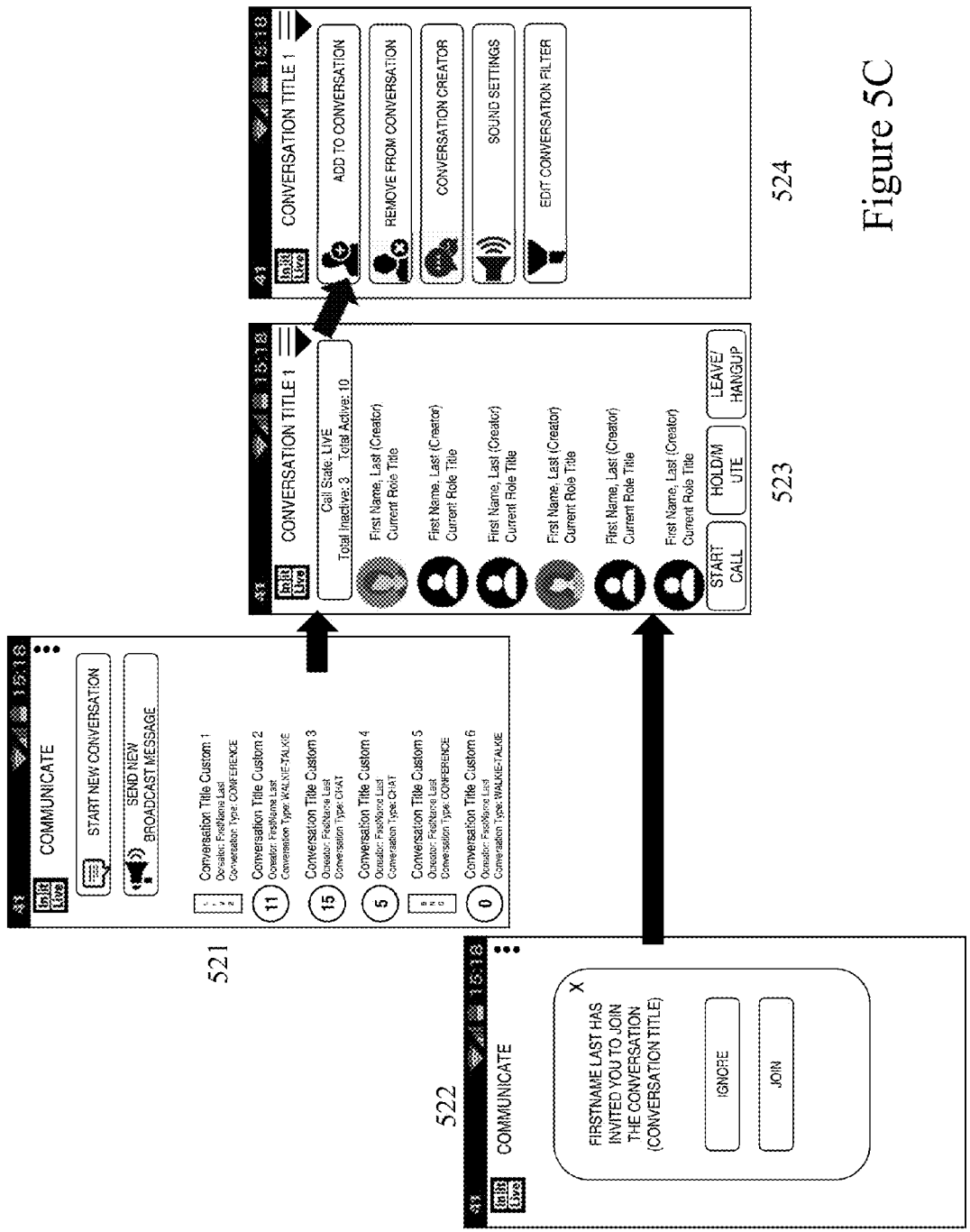

Now referring to FIG. 5C there are depicted first to fourth exemplary screenshots 521 to 524 respectively for a WKTKAP according to an embodiment wherein the user receives a communication relating to an active communication session (first screenshot 521) or is invited to join a communication session (second screenshot 522). Accordingly, where the user receives a communication relating to an active communication session (first screenshot 521) they can select the communication with the messages, in this instance "Conversation Title 1 Custom" with the status live and is a conference. Other communication sessions may be ongoing or complete etc. From first screenshot 521 the user is presented with third screenshot 523 wherein the conversation members are depicted together with status information of the communication session, e.g. number of active users, number of inactive users, etc. The user is able through the button options at the bottom of the screen to start a call or join, hold/mute, and leave/hangup the conference they have selected. In the event the conversation was a walkie-talkie or chat then the user would be presented with other button options as appropriate to the communication type. Second screenshot 522 depicts the presentation of an invitation to a user to join a conversation with an indication of the requester. In third screenshot 523 the user may select a drop-down menu selector wherein the drop-down menu is displayed as indicated in fourth screenshot 524 wherein the user may add to conversation, remove from conversation, obtain information or communicate to the conference creator, adjust sound settings, and edit conversation filters. Other options may be provided to the user as appropriate according to a variety of factors including, but not limited to, their role, location, venue, event, communication session status, and whether they are the communication session creator or not.

Figure 5D:
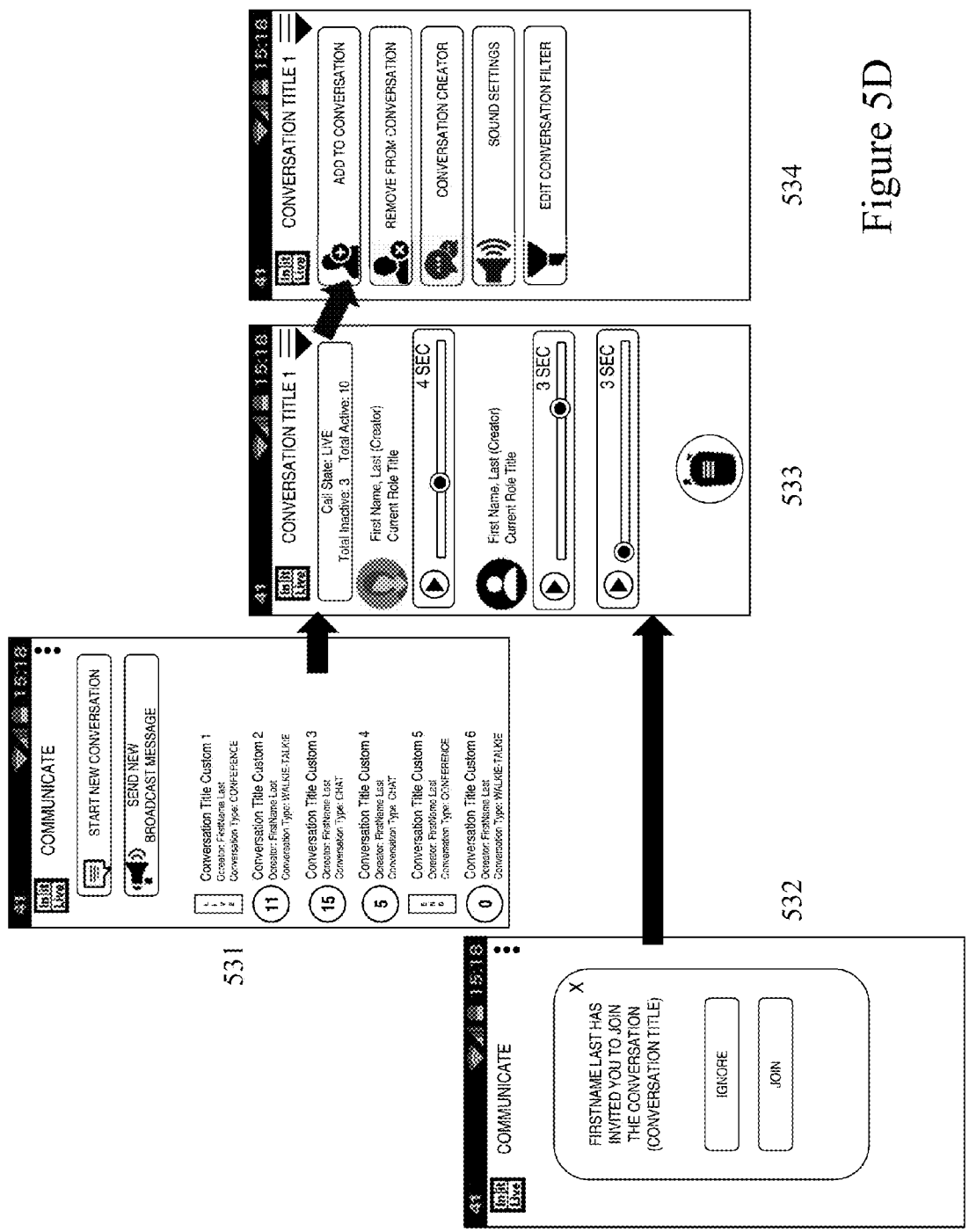

Referring to FIG. 5D there are depicted first to fourth exemplary screenshots 531 to 534 respectively for a WKTKAP according to an embodiment wherein the user receives a communication relating to an active communication session (first screenshot 531) or is invited to join a communication session (second screenshot 532). Accordingly, where the user receives a communication relating to an active communication session (first screenshot 521) they can select the communication with the messages, in this instance "Conversation Title Custom 2" which is indicated as having 11 messages and is a walkie-talkie session. Other communication sessions may be ongoing or complete etc. From first screenshot 521 the user is presented with third screenshot 523 wherein the conversation members are depicted together with status information of the communication session, e.g. number of active users, number of inactive users, etc. Associated with each user are the sound bites they have provided. As depicted the user can scroll down through the users and sound bites which have associated context data such as location, place, venue, time, sound bite duration etc. As the communication session/type is walkie-talkie the option presented at the bottom of the screenshot is a "push-to-talk" icon. Second screenshot 532 depicts the presentation of an invitation to a user to join a conversation with an indication of the requester. In third screenshot 523 the user may select a drop-down menu selector wherein the drop-down menu is displayed as indicated in fourth screenshot 524 wherein the user may add to conversation, remove from conversation, obtain information or communicate to the conference creator, adjust sound settings, and edit conversation filters. Other options may be provided to the user as appropriate according to a variety of factors including, but not limited to, their role, location, venue, event, communication session status, and whether they are the communication session creator or not.

Optionally, the user may be presented with the third screenshot 533 in different formats, e.g. in time order, grouped by location/venue, grouped by role, duration etc. rather than by user. The options available may be determined based upon a variety of factors including, but not limited to, their role, location, venue, event, communication session status, and whether they are the communication session creator or not. A user may be provided with all messages relating to their shift or only those relating to their role within a shift etc. The user may opt to have the sound bites played to the loudspeaker of their PED or to a headset/headphones or in other instances a speech-to-text conversion may be applied, for example.

Figure 5E:
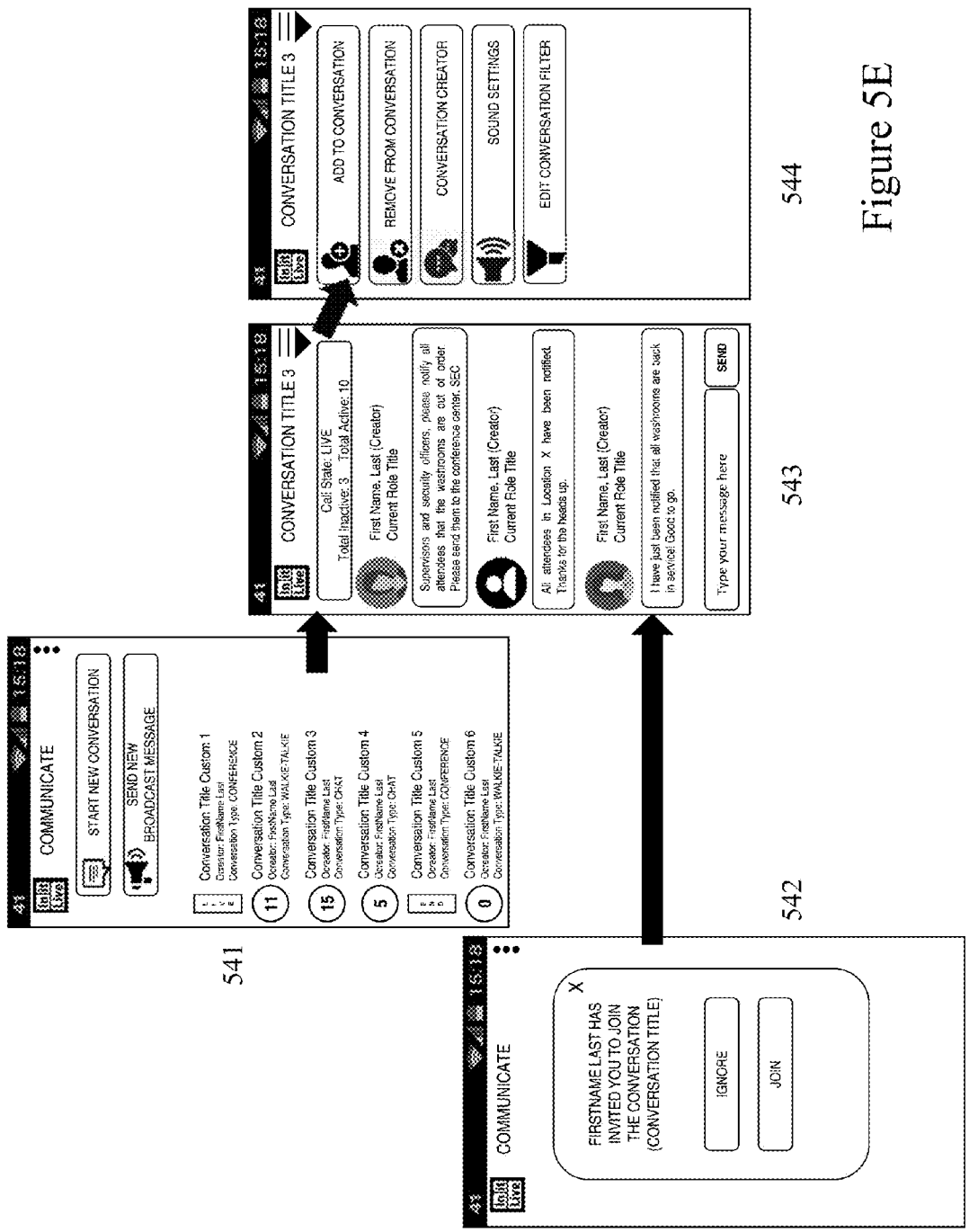

Referring to FIG. 5E there are depicted first to fourth exemplary screenshots 541 to 544 respectively for a WKTKAP according to an embodiment wherein the user receives a communication relating to an active communication session (first screenshot 541) or is invited to join a communication session (second screenshot 542). In this instance the communication type is a call wherein the user is presented with third screen shot 543. In third screenshot 543 the user may select a drop-down menu selector wherein the drop-down menu is displayed as indicated in fourth screenshot 544 which is similar to fourth screenshots 524 and 534 in FIGS. 5C and 5D respectively.

As the communication type is call then third screenshot 543 depicts text based communications. The user is presented with conversation members together with status information of the communication session, e.g. number of active users, number of inactive users, etc. Associated with each user are their text messages they have provided. As depicted the user can scroll down through the users and text messages which have associated context data such as location, place, venue, time etc. As the communication session/type is call the option presented at the bottom of the screenshot is for the user to create a text message and send. Optionally, the user may be presented with the third screenshot 533 in different formats, e.g. in time order, grouped by location/venue, grouped by role, duration etc. rather than by user. The options available may be determined based upon a variety of factors including, but not limited to, their role, location, venue, event, communication session status, and whether they are the communication session creator or not. A user may be provided with all messages relating to their shift or only those relating to their role within a shift etc. The user may opt to have the text messages presented audibly to the loudspeaker of their PED or to a headset/headphones via a speech-to-text conversion.

The transfer of the communication content, e.g. a sound bite, can be done via a telephony network as well as a data network. The WKTK service could be provided by an open meet-me type conference set up between all the parties involved. In that case, the conference would stay live until either the creator/instigator shuts it down, or the last member leaves. The determination of the parties involved would be the same, the difference would be that a third party service (for example the service provided by Twillio) could be used to set up a conference and all parties called and added on answer.

Within the screenshots presented in FIGS. 5A to 5E the channels of a prior art walkie-talkie are now replaced by the different communications. Accordingly, the user may be active on several "channels" simultaneously receiving and transmitting information wherein the "channel" is established by the policy chain(s) associated with the user. Accordingly, whilst the user is transmitting or receiving they are not blocked from receiving other content relating to other "channels."

Figure 6:
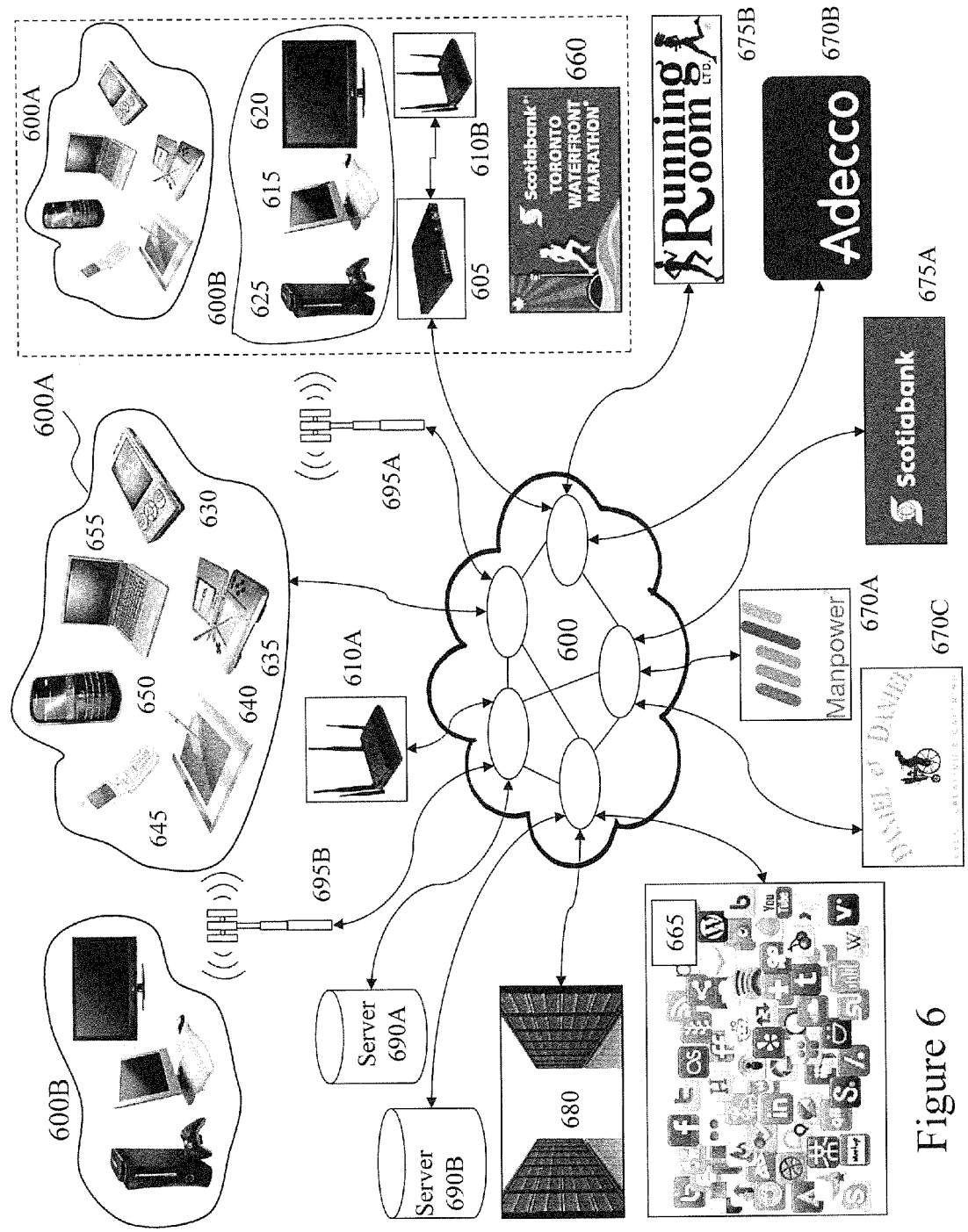
FIG. 6 depicts a network environment within which embodiments of the invention may be employed.

Now referring to FIG. 6 there is depicted a network environment 600 within which embodiments of the invention may be employed supporting "push to talk" or "walkie-talkie" applications/platforms (WKTKAPs) according to embodiments of the invention. Such WKWTAPs, for example supporting multiple device types, multiple communication channels, fixed content, dynamic content, etc. As shown first and second user groups 600A and 600B respectively interface to a telecommunications network 600. Within the representative telecommunication architecture a remote central exchange 680 communicates with the remainder of a telecommunication service providers network via the network 600 which may include for example long-haul OC-48/OC-192 backbone elements, an OC-48 wide area network (WAN), a Passive Optical Network, and a Wireless Link. The central exchange 680 is connected via the network 600 to local, regional, and international exchanges (not shown for clarity) and therein through network 600 to first and second cellular APs 695A and 695B respectively which provide Wi-Fi cells for first and second user groups 600A and 600B respectively. Also connected to the network 600 are first and second Wi-Fi nodes 610A and 610B, the latter of which being coupled to network 600 via router 605. Second Wi-Fi node 610B is associated with Enterprise 660, e.g. Toronto Waterfront Marathon™, within which other first and second user groups 600A and 600B exist. Second user group 600B may also be connected to the network 600 via wired interfaces including, but not limited to, DSL, Dial-Up, DOCSIS, Ethernet, G.hn, ISDN, MoCA, PON, and Power line communication (PLC) which may or may not be routed through a router such as router 605.

Within the cell associated with first AP 610A the first group of users 600A may employ a variety of PEDs including for example, laptop computer 655, portable gaming console 635, tablet computer 640, smartphone 650, cellular telephone 645 as well as portable multimedia player 630. Within the cell associated with second AP 610B are the second group of users 600B which may employ a variety of FEDs including for example gaming console 625, personal computer 615 and wireless/Internet enabled television 620 as well as cable modem 605. First and second cellular APs 695A and 695B respectively provide, for example, cellular GSM (Global System for Mobile Communications) telephony services as well as 3G and 4G evolved services with enhanced data transport support. Second cellular AP 695B provides coverage in the exemplary embodiment to first and second user groups 600A and 600B. Alternatively the first and second user groups 600A and 600B may be geographically disparate and access the network 600 through multiple APs, not shown for clarity, distributed geographically by the network operator or operators. First cellular AP 695A as show provides coverage to first user group 600A and environment 670, which comprises second user group 600B as well as first user group 600A. Accordingly, the first and second user groups 600A and 600B may according to their particular communications interfaces communicate to the network 600 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 600A may form associations either through standards such as IEEE 802.15 and Bluetooth as well in an ad-hoc manner.

Also connected to the network 600 are Social Networks (SOCNETS) 665, first and second personnel providers 670A and 670B respectively, e.g. Manpower™ and Adecco™ catering service provider 670C, e.g. Daniel & Daniel (Toronto, Canada), and first to second partner enterprises 675A and 675B respectively, e.g. Scotiabank™ and Running Room™, as well as first and second servers 690A and 690B which together with others, not shown for clarity. First and second servers 690A and 690B may host according to embodiments of the inventions multiple services associated with a provider of WKWTAPs; a provider of a SOCNET or Social Media (SOME) exploiting WKWTAP features; a provider of a SOCNET and/or SOME not exploiting WKWTAP features; a provider of services to PEDS and/or FEDS; a provider of one or more aspects of wired and/or wireless communications; an Enterprise 660 exploiting WKWTAP features; license databases; content databases; event databases; registration databases; customer databases; contact databases; websites; and software applications for download to or access by FEDs and/or PEDs exploiting and/or hosting WKWTAP features. First and second primary content servers 690A and 690B may also host for example other Internet services such as a search engine, financial services, third party applications and other Internet based services.

Accordingly, an enterprise user or individual user (ENUINU) may exploit a PED and/or FED within an Enterprise 660, for example, and access one of the first or second primary content servers 690A and 690B respectively to perform an operation such as accessing/downloading an application which provides WKWTAP features according to embodiments of the invention; execute an application already installed providing WKWTAP features; execute a web based application providing WKWTAP features; or exploit WKWTAP features within another application. Similarly, an ENUINU may undertake such actions or others exploiting embodiments of the invention exploiting a PED or FED within first and second user groups 600A and 600B respectively via one of first and second cellular APs 695A and 695B respectively and first Wi-Fi nodes 610A.

Figure 7:
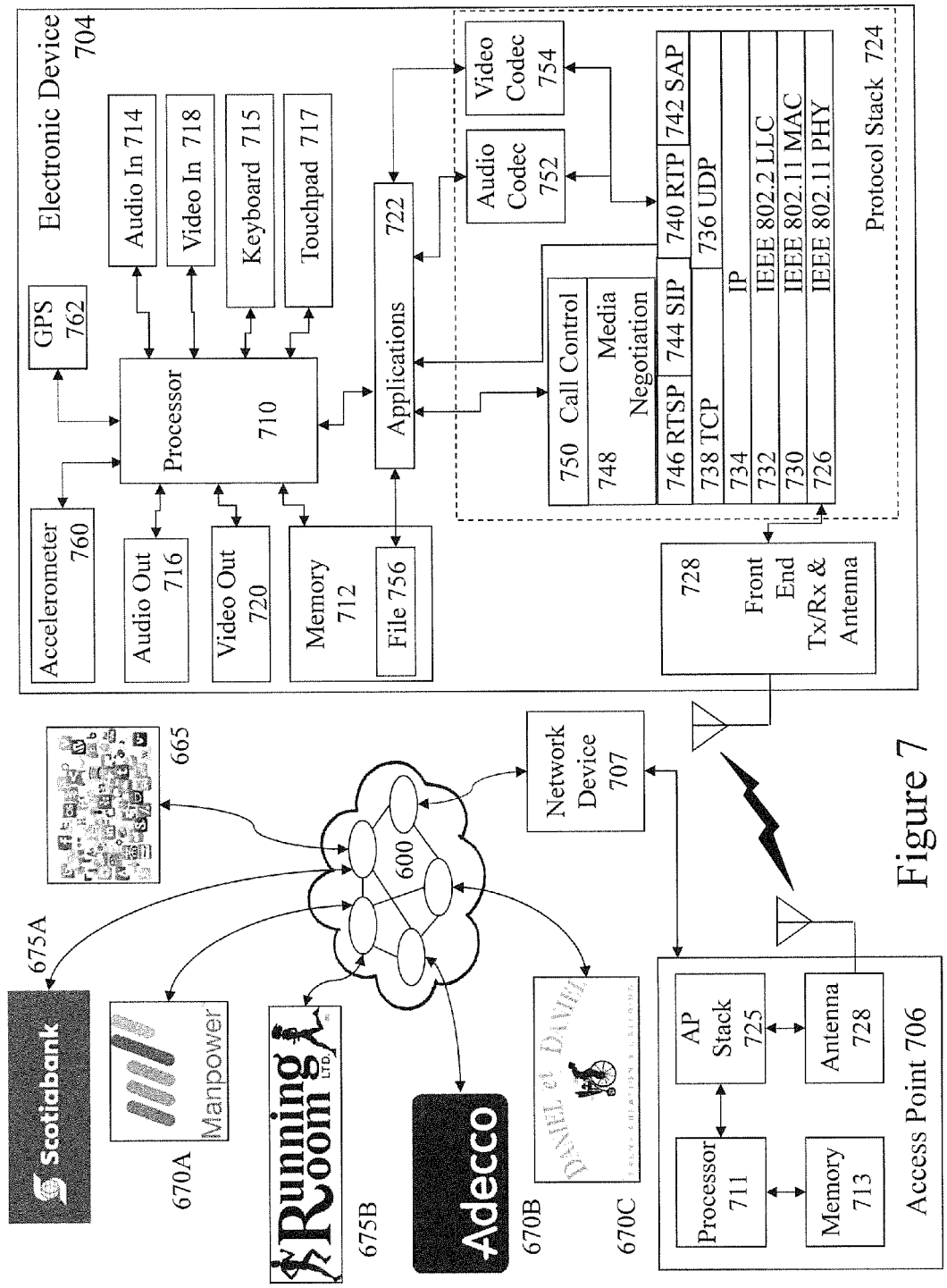
FIG. 7 depicts a wireless portable electronic device supporting communications to a network such as depicted in FIG. 6 and as supporting embodiments of the invention.

Now referring to FIG. 7 there is depicted an electronic device 704 and network access point 707 supporting WKWTAP features according to embodiments of the invention. Electronic device 704 may, for example, be a PED and/or FED and may include additional elements above and beyond those described and depicted. Also depicted within the electronic device 704 is the protocol architecture as part of a simplified functional diagram of a system 700 that includes an electronic device 704, such as a smartphone 655, an access point (AP) 706, such as first AP 610, and one or more network devices 707, such as communication servers, streaming media servers, and routers for example such as first and second servers 690A and 690B respectively. Network devices 707 may be coupled to AP 706 via any combination of networks, wired, wireless and/or optical communication links such as discussed above in respect of FIG. 6 as well as directly as indicated. Network devices 707 are coupled to network 600 and therein Social Networks (SOCNETS) 665, first and second personnel providers 670A and 670B respectively, e.g. Manpower™ and Adecco™, catering service provider 670C, e.g. Daniel & Daniel (Toronto, Canada), and first to second partner enterprises 675A and 675B respectively, e.g. Scotiabank™ and Running Room™.

The electronic device 704 includes one or more processors 710 and a memory 712 coupled to processor(s) 710. AP 706 also includes one or more processors 711 and a memory 713 coupled to processor(s) 710. A non-exhaustive list of examples for any of processors 710 and 711 includes a central processing unit (CPU), a digital signal processor (DSP), a reduced instruction set computer (RISC), a complex instruction set computer (CISC) and the like. Furthermore, any of processors 710 and 711 may be part of application specific integrated circuits (ASICs) or may be a part of application specific standard products (ASSPs). A non-exhaustive list of examples for memories 712 and 713 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 704 may include an audio input element 714, for example a microphone, and an audio output element 716, for example, a speaker, coupled to any of processors 710. Electronic device 704 may include a video input element 718, for example, a video camera or camera, and a video output element 720, for example an LCD display, coupled to any of processors 710. Electronic device 704 also includes a keyboard 715 and touchpad 717 which may for example be a physical keyboard and touchpad allowing the user to enter content or select functions within one of more applications 722. Alternatively the keyboard 715 and touchpad 717 may be predetermined regions of a touch sensitive element forming part of the display within the electronic device 704. The one or more applications 722 that are typically stored in memory 712 and are executable by any combination of processors 710. Electronic device 704 also includes accelerometer 760 providing three-dimensional motion input to the process 710 and GPS 762 which provides geographical location information to processor 710.

Electronic device 704 includes a protocol stack 724 and AP 706 includes a communication stack 725. Within system 700 protocol stack 724 is shown as IEEE 802.11 protocol stack but alternatively may exploit other protocol stacks such as an Internet Engineering Task Force (IETF) multimedia protocol stack for example. Likewise AP stack 725 exploits a protocol stack but is not expanded for clarity. Elements of protocol stack 724 and AP stack 725 may be implemented in any combination of software, firmware and/or hardware. Protocol stack 724 includes an IEEE 802.11-compatible PHY module 726 that is coupled to one or more Front-End Tx/Rx & Antenna 728, an IEEE 802.11-compatible MAC module 730 coupled to an IEEE 802.2-compatible LLC module 732. Protocol stack 724 includes a network layer IP module 734, a transport layer User Datagram Protocol (UDP) module 736 and a transport layer Transmission Control Protocol (TCP) module 738.

Protocol stack 724 also includes a session layer Real Time Transport Protocol (RTP) module 740, a Session Announcement Protocol (SAP) module 742, a Session Initiation Protocol (SIP) module 744 and a Real Time Streaming Protocol (RTSP) module 746. Protocol stack 724 includes a presentation layer media negotiation module 748, a call control module 750, one or more audio codecs 752 and one or more video codecs 754. Applications 722 may be able to create maintain and/or terminate communication sessions with any of devices 707 by way of AP 706. Typically, applications 722 may activate any of the SAP, SIP, RTSP, media negotiation and call control modules for that purpose. Typically, information may propagate from the SAP, SIP, RTSP, media negotiation and call control modules to PHY module 726 through TCP module 738, IP module 734, LLC module 732 and MAC module 730.

It would be apparent to one skilled in the art that elements of the electronic device 704 may also be implemented within the AP 706 including but not limited to one or more elements of the protocol stack 724, including for example an IEEE 802.11-compatible PHY module, an IEEE 802.11-compatible MAC module, and an IEEE 802.2-compatible LLC module 732. The AP 706 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 704 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Whilst the above description and examples have been primarily presented with respect to communications for personnel within events such as sports events, festivals, etc. it would be evident to one of skill in the art that the concepts may be applied to a variety of other environments including, for example, workplace communications, sports team communications, etc.

Whilst the above description and examples have been primarily presented with respect to users employing their own PEDs rather than being provided walkie-talkies it would be evident to one of skill in the art that the embodiments of the invention in respect of WKTKAPs may also support walkie-talkies as part of the devices. For example, a user with a walkie-talkie may select a channel and push-to-talk wherein their message is both broadcast to all users on that channel on other walkie-talkies but also communicated to other users via the network 107 not exploiting walkie-talkies wherein the event management server receives, for example, a sound bite from a user's walkie-talkie with an associated channel identified and device identifier. Based upon these the event management server associates the sound bite to a conversation and pushes it to the users within the appropriate roles/location etc. Where the communication type is a conference call or walkie-talkie the sound bite is transmitted as an audio file but where the communication type is chat then the event management server may convert the audio content to text.

Where multiple "channels" are associated with an event for communications the event management server may automatically perform conflict resolution.

It would be evident that communications within a channel or communication session or a shift or event etc. may be encrypted and that, for example, security personnel at an event may exploit encryption whilst other communications are open. Optionally, different geofenced regions may be associated with different encryption keys so that communications within security personnel are defined further by a geolocation/geofencing.

It would be evident that a conference call configured according to an embodiment of the invention is established absent any continuously open channel between the users/members of the conference call. Users only transmit when they have content and users only receive content when there is some to receive. As such the conference call be ongoing for an extended period of time with intermittent content broadcast.

Geolocation/geofencing may exploit a system within the user's PED such as GPS, for example, or it may alternatively exploit one or more other techniques as known within the art such as transmitter identity, transmitter triangulation, received signal strengths from transmitters, localized beacons, etc. A venue may be a "zoned" into a number of micro-venues defined by one or more geolocation/geofencing aspects.

The WKTKAPs as described and depicted have been primarily presented from the user's viewpoint as a software application in execution upon their PED, for example. However, in other embodiments of the invention the WKTKAP may be accessed and/or configured through web pages or web browsers. Such web pages may be accessed on the user's PED or they may alternatively be accessed upon a FED. Accordingly, for example, ticket office personnel may have a browser window open providing them with WKTKAP content whilst their screen also provides the ticket sales management application.

Optionally, a communication such as a sound bite and/or text may include an attachment or attachments such as a data file, a content file, an image, a video, or an audio recording.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of managing communications mobile communications comprising:
   receiving content within an event application in execution upon an electronic device associated with a user and connected to a network from another electronic device also connected to the network executing the event application and associated with another user;
   associating the received content with a communication based upon a filter defined by a policy chain established within the event application in dependence upon a role associated with the user within an event; and
   presenting the information upon the electronic device; wherein
   the another user is also associated with the event and a second role within the event; and the user and the another user have no association other than that they are both members of a group of users associated with the event whose contact data is stored within a database accessible by a user notification server connected to the network through which the communication from the another user to the user is routed.

2. The method according to claim 1, wherein the database stores data relating to roles for registered users of the event application, specific times for which a registered user is associated with a specific role, and an event for which the user will perform the specific role at the specific times.

3. The method according to claim 1, wherein
the event application supports emulation of a walkie-talkie by an electronic device and provide communications that mimic use of walkie-talkies by participants; and
a channel of a plurality of channels upon which a message is at least one of received and transmitted is established in dependence upon a policy chain including the role the user is currently associated with.

4. The method according to claim 1, wherein
the policy chain is dynamically established in dependence upon at least one of the role, a location, a venue, a shift, a shift status, and the event for which the user is registered.

5. The method according to claim 1, wherein
the filter is dynamically established in dependence upon at least one of the role, a location, a venue, a shift, a shift status, and the event for which the user is registered.

6. The method according to claim 1, wherein
the electronic device upon which the content is provided is either a walkie-talkie or an electronic device comprising a display and at least one of an audio input interface, an audio output interface, and a keyboard.

7. The method according to claim 1, wherein
the electronic device upon which the content is an electronic device and the content is provided to the user via the event application as a web page of a plurality of web pages.

8. Computer readable instructions for execution by a microprocessor stored in a non-volatile, non-transitory memory, the instructions when executed relating to a process comprising:
receiving content within an event application in execution upon an electronic device associated with a user and connected to a network from another electronic device also connected to the network executing the event application and associated with another user;
associating the received content with a communication based upon a filter defined by a policy chain established within the event application in dependence upon a role associated with the user within an event; and
presenting the information upon the electronic device; wherein
the another user is also associated with the event and a second role within the event; and
the user and the another user have no association other than that they are both members of a group of users associated with the event whose contact data is stored within a database accessible by a user notification server connected to the network through which the communication from the another user to the user is routed.

9. The instructions according to claim 8, wherein
the database stores data relating to roles for registered users of the event application, specific times for which a registered user is associated with a specific role, and an event for which the user will perform the specific role at the specific times.

10. The instructions according to claim 8, wherein
the event application supports emulation of a walkie-talkie by an electronic device and provide communications that mimic use of walkie-talkies by participants; and
a channel of a plurality of channels upon which a message is at least one of received and transmitted is established in dependence upon a policy chain including the role the user is currently associated with.

11. The instructions according to claim 8, wherein
the policy chain is dynamically established in dependence upon at least one of the role, a location, a venue, a shift, a shift status, and the event for which the user is registered.

12. The instructions according to claim 8, wherein
the filter is dynamically established in dependence upon at least one of the role, a location, a venue, a shift, a shift status, and the event for which the user is registered.

13. The instructions according to claim 8, wherein
the electronic device upon which the content is provided is either a walkie-talkie or an electronic device comprising a display and at least one of an audio input interface, an audio output interface, and a keyboard.

14. The instructions according to claim 8, wherein
the electronic device upon which the content is an electronic device and the content is provided to the user via the event application as a web page of a plurality of web pages.

* * * * *